(12) United States Patent
Wittkopp et al.

(10) Patent No.: US 8,460,151 B2
(45) Date of Patent: Jun. 11, 2013

(54) MULTI-SPEED TRANSMISSION HAVING AUTOMATIC AND MANUAL MODES

(75) Inventors: Scott H. Wittkopp, Ypsilanti, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 151 days.

(21) Appl. No.: 13/182,186

(22) Filed: Jul. 13, 2011

(65) Prior Publication Data

US 2012/0071289 A1    Mar. 22, 2012

Related U.S. Application Data

(60) Provisional application No. 61/383,994, filed on Sep. 17, 2010.

(51) Int. Cl.
*F16H 3/62* (2006.01)
(52) U.S. Cl.
USPC .......................................................... 475/276
(58) Field of Classification Search
None
See application file for complete search history.

(56) References Cited

U.S. PATENT DOCUMENTS

| | | | |
|---|---|---|---|
| 6,176,803 B1 * | 1/2001 | Meyer et al. | 475/286 |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,402,119 B2 | 7/2008 | Kamada et al. | |
| 7,766,790 B2 * | 8/2010 | Stevenson et al. | 477/8 |
| 7,798,932 B2 * | 9/2010 | Wittkopp et al. | 475/269 |
| 7,905,809 B2 * | 3/2011 | Wittkopp et al. | 475/269 |
| 7,998,013 B2 * | 8/2011 | Phillips et al. | 475/276 |
| 8,047,947 B2 * | 11/2011 | Phillips et al. | 475/275 |
| 8,167,766 B2 * | 5/2012 | Phillips et al. | 475/276 |
| 8,202,190 B2 * | 6/2012 | Phillips et al. | 475/275 |
| 2005/0090362 A1 | 4/2005 | Abe et al. | |
| 2011/0015021 A1 * | 1/2011 | Maguire et al. | 475/8 |
| 2011/0183806 A1 * | 7/2011 | Wittkopp et al. | 475/263 |
| 2011/0251014 A1 * | 10/2011 | Leesch et al. | 475/296 |
| 2012/0115663 A1 * | 5/2012 | Wilton et al. | 475/144 |

FOREIGN PATENT DOCUMENTS

DE    WO2010060500    6/2010

* cited by examiner

*Primary Examiner* — Dirk Wright (57) ABSTRACT

A transmission is disclosed having an input member, an output member, and first, second, third and fourth planetary gear sets each having first, second and third members. A plurality of interconnecting members continuously interconnect one of the first, second and third members of one of the planetary gear sets with one of the first, second and third members of another of the planetary gear sets. Six torque-transmitting mechanisms are selectively engageable in combinations of at least three to establish at least nine forward speed ratios and at least one reverse speed ratio between the input member and the output member. The first of the five torque-transmitting mechanisms is a selectable one-way clutch.

20 Claims, 4 Drawing Sheets

| GEAR STATE | TORQUE-TRANSMITTING MECHANISM | | | | | | |
|---|---|---|---|---|---|---|---|
| | 24 | 26 | 28 A | 28 M | 30 | 32A 32B | 34 |
| R | X | X | L | L | | | |
| N | | O | O | O | | | |
| 1st | | X | U | L | X | | |
| 2nd | | | U | L | X | X | |
| 3rd | | X | U | L | | X | |
| 4th | | X | U | L | | | X |
| 5th | | X | U | U | | X | X |
| 6th | | | U | U | X | X | X |
| 7th | | X | U | U | X | | X |
| 8th | X | | U | U | X | | X |
| 9th | X | X | U | U | | | X |

FIG. 7

MULTI-SPEED TRANSMISSION HAVING AUTOMATIC AND MANUAL MODES

CROSS-REFERENCE TO RELATED APPLICATIONS

This application claims priority to U.S. Provisional Application No. 61/383,994, filed on Sep. 17, 2010, which is hereby incorporated in its entirety herein by reference.

FIELD

The invention relates to a multi-speed transmission having both a plurality of planetary gear sets and torque transmitting devices that are selectively engageable to achieve multiple gear ratios in both an automatic mode and a manual mode.

BACKGROUND

The statements in this section merely provide background information related to the present disclosure and may or may not constitute prior art.

A multi-speed transmission uses a combination of clutches, planetary gear arrangements, and fixed interconnections to achieve a plurality of gear ratios. In one example, friction type clutches are used in the transmission, and are selectively engaged to achieve a particular gear ratio. However, when disengaged, the friction clutches tend to produce drag when there is relative motion between the clutch input member and output member, which can lead to decreased fuel economy.

In an effort to improve fuel economy, a one-way clutch may be employed instead of a friction clutch to transmit power from a first input member to a second driven member. The one-way clutch transmits torque in a first direction and releases or decouples in a second, opposite direction. Once released, the driving member is free to rotate in the second opposite direction relative to the first direction, and the one-way clutch can overrun or freewheel. This allows the vehicle to travel in a coasting or gliding mode where the drivetrain is decoupled from the engine, thus eliminating any losses associated with the drivetrain turning the engine.

Engine braking occurs when torque to the driving member is reduced, the driving member and the driven member remained coupled to one another, and back torque as a result of turning the engine with reduced power and pumping forces is transmitted in an effort to reduce the speed of the driven member. However, freewheeling the one-way clutch decouples the driven and the driving member, thereby making engine braking not possible. Thus, engine braking in a vehicle operated with a one-way clutch will not work unless additional components are included, such as an additional clutch to selectively couple the driving member and the driven member.

Thus, while current transmissions achieve their intended purpose, there is a need for a new and improved transmission which exhibits improved performance while allowing engine braking.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches, brakes and a selectable one-way clutch.

An example of the present invention includes four planetary gear sets, three clutches and three brakes.

Another example of the present invention includes a transmission having four planetary gear sets.

Yet another example of the present invention includes a transmission having at least nine forward speeds and at least one reverse.

Yet another example of the present invention includes a transmission having four planetary gear sets, a plurality of coupling members and a plurality of torque transmitting devices.

The above features and advantages and other features and advantages of the present invention are readily apparent from the following detailed description of the best modes for carrying out the invention when taken in connection with the accompanying drawings.

DETAILED DESCRIPTION

The following description is merely exemplary in nature and is not intended to limit the present disclosure, application, or uses.

At the outset, it should be appreciated that in the particular example provided, the nine speed automatic transmission of the present invention has an arrangement of permanent mechanical connections between the elements of the four planetary gear sets. These mechanical connections generically link or relate the transmission embodiments. More specifically, a first component or element of a first planetary gear set is permanently coupled to a first component or element of the second planetary gear set. A second component or element of the first planetary gear set is permanently coupled to a first component or element of a third planetary gear set. A second component or element of the second planetary gear set is permanently coupled to a second component or element of the third planetary gear set. The first component or element of the third planetary gear set is permanently coupled to a first component or element of a fourth planetary gear set.

Figure 1:
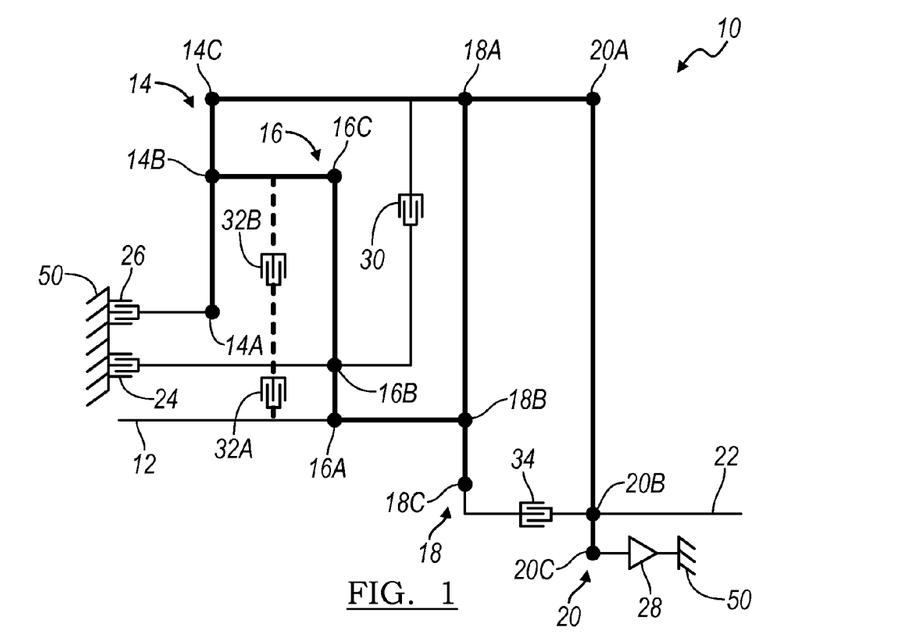
FIG. 1 is a lever diagram of an example of a transmission in accordance with the present invention.

Referring now to FIG. 1, an embodiment of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output member 22. It should be appreciated that the designations "first", "second", "third", and "fourth" as used to describe the planetary gear sets are arbitrary and may be varied so long as the interconnections described herein are consistent.

The input member 12 is coupled to the first node 16A of the second planetary gear set 16. The second node 14B of the first planetary gear set 14 is coupled to the third node 16C of the second planetary gear set 16. The third node 14C of the first planetary gear set 14 is coupled to the first node 18A of the third planetary gear set 18. The first node 16A of the second planetary gear set 16 is coupled to the second node 18B of the third planetary gear set 18. The first node 18A of the third planetary gear set 18 is coupled to the first node 20A of the fourth planetary gear set 20. The output member 22 is coupled to the second node 20B of the fourth planetary gear set 20.

A first torque-transmitting mechanism 24 selectively connects the second node 16B of the second planetary gear set 16 with a stationary element or transmission housing 50. A second torque-transmitting mechanism 26 selectively connects the first node 14A of the first planetary gear set 14 with the stationary element or transmission housing 50. A third torque-transmitting mechanism 28 selectively connects the third node 20C of the fourth planetary gear set 20 with the stationary element or transmission housing 50. A fourth torque-transmitting mechanism 30 selectively connects the third node 14C of the first planetary gear set 14 and the first node 18A of the third planetary gear set 18 with the second node 16B of the second planetary gear set 16. The transmission 10 includes two alternative examples of the fifth torque-transmitting mechanism 32A, 32B which are depicted using dashed lines in place of solid lines. In one example of the present invention, a fifth torque-transmitting mechanism 32A selectively connects the second node 16B of the second planetary gear set 16 with the input member 12. Alternatively in another example of the present invention, a fifth torque-transmitting mechanism 32B selectively connects the second node 16B of the second planetary gear set 16 with the second node 14B of the first planetary gear set 14 and the third node 16C of the second planetary gear set 16. A sixth torque-transmitting mechanism 34 selectively connects the third node 18C of the third planetary gear set 18 with the second node 20B of the fourth planetary gear set 20 and the output member 22.

Figure 2:
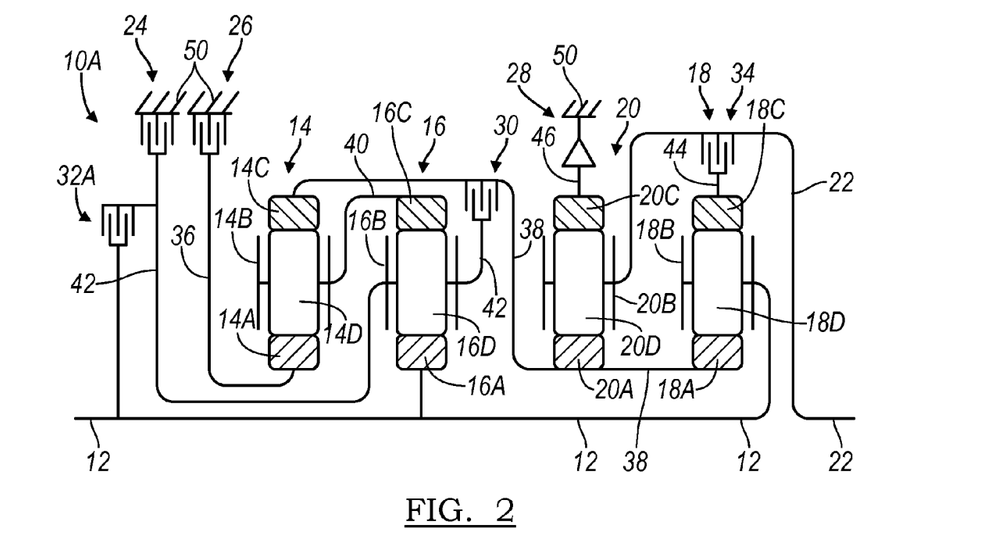
FIG. 2 is a schematic representation of an example of the transmission shown in FIG. 1 in accordance with the present invention.
Figure 3:
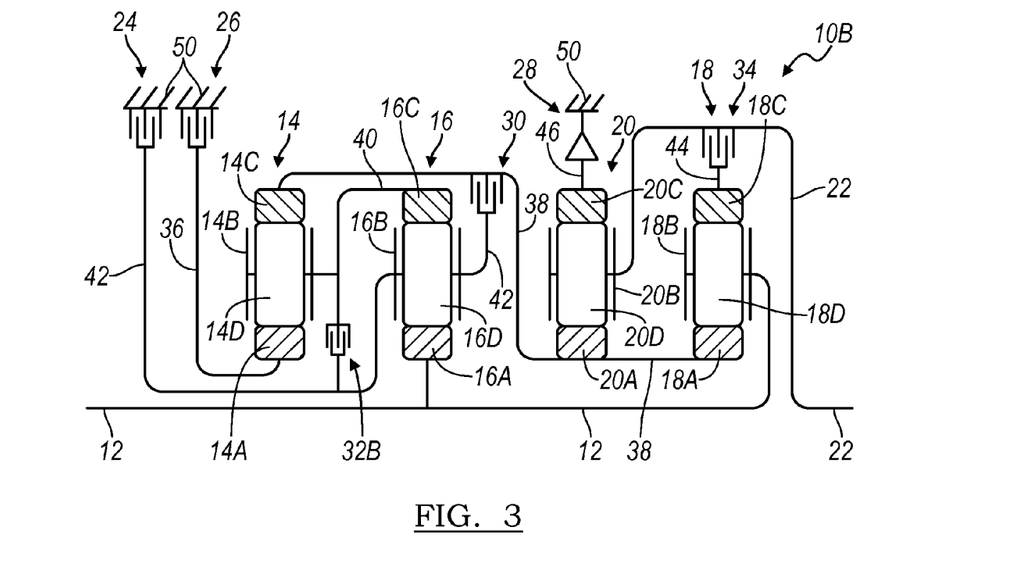
FIG. 3 is a schematic representation of another example of the transmission shown in FIG. 1 in accordance with the present invention.

Referring now to FIGS. 2 and 3, two stick diagrams present a schematic layout of an example of the nine speed transmission 10A, 10B according to the present invention. In FIGS. 2 and 3, the numbering from the lever diagram of FIG. 1 is carried over. The clutches, brake and couplings are correspondingly presented whereas the nodes of the planetary gear sets now appear as components of planetary gear sets such as sun gears, ring gears, planet gears and planet gear carriers.

In an example of the present invention, a first planetary gear set 14 is a simple planetary gear set. More specifically, planetary gear set 14 includes a sun gear member 14A, a ring gear member 14C and a carrier member 14B that rotatably supports a set of planet gears 14D (only one shown). Sun gear member 14A is connected for common rotation with a first shaft or interconnecting member 36. Ring gear member 14C is connected for common rotation with a second shaft or interconnecting member 38. Carrier member 14B is connected for common rotation with a third shaft or interconnecting member 40. The planet gears 14D are configured to intermesh with each of the sun gear member 14A and the ring gear member 14C.

In another example of the present invention, a second planetary gear set 16 is a simple planetary gear set. More specifically, planetary gear set 16 includes a sun gear member 16A, a ring gear member 16C and a carrier member 16B that rotatably supports a set of planet gears 16D (only one shown). Sun gear member 16A is connected for common rotation with an input shaft or member 12. Ring gear member 16C is connected for common rotation with the third shaft or interconnecting member 40. Carrier member 16B is connected for common rotation with a fourth shaft or interconnecting member 42. The planet gears 16D are configured to intermesh with each of the sun gear member 16A and the ring gear member 16C.

In yet another example of the present invention, a third planetary gear set 18 is a simple planetary gear set. More specifically, planetary gear set 18 includes a sun gear member 18A, a ring gear member 18C and a carrier member 18B that rotatably supports a set of planet gears 18D (only one shown). Sun gear member 18A is connected for common rotation with the second shaft or interconnecting member 38. Ring gear member 18C is connected for common rotation with a fifth shaft or interconnecting member 44. Carrier member 18B is connected for common rotation with the input shaft or member 12. The planet gears 18D are configured to intermesh with each of the sun gear member 18A and the ring gear member 18C.

In yet another example of the present invention, a fourth planetary gear set 20 is a simple planetary gear set. More specifically, planetary gear set 20 includes a sun gear member 20A, a ring gear member 20C and a carrier member 20B that rotatably supports a set of planet gears 20D (only one shown). Sun gear member 20A is connected for common rotation with the second shaft or interconnecting member 38. Ring gear member 20C is connected for common rotation with a sixth shaft or interconnecting member 46. Carrier member 20B is connected for common rotation with an output shaft or member 22. The planet gears 20D are configured to intermesh with each of the sun gear member 20A and the ring gear member 20C.

The input shaft or member 12 is preferably continuously connected to an engine (not shown) or to a turbine of a torque converter (not shown). The output shaft or member 22 is preferably continuously connected with a final drive unit or transfer case (not shown).

The torque-transmitting mechanisms 24, 26, 28, 30, 32A, 32B, and 34 allow for selective interconnection of the shafts or interconnecting members 36-46, members of the planetary gear sets 14-20 and the stationary element or transmission housing 50. The torque-transmitting mechanisms include a first and second brake 24, 26, a selectable one-way clutch, dog clutch or band 28, a first and third clutch 30, 34 and alternative second clutches 32A, 32B. For example, the first brake 24 is selectively engageable to connect the fourth shaft or interconnecting member 42 with the stationary element or transmission housing 50. The second brake 26 is selectively engageable to connect the first shaft or interconnecting member 36 with the stationary element or transmission housing 50. The selectable one-way clutch 28 is selectively engageable to connect the sixth shaft or interconnecting member 46 with the stationary element or transmission housing 50. The first clutch 30 is selectively engageable to connect the second shaft or interconnecting member 38 with the fourth shaft or interconnecting member 42. In transmission 10A shown in FIG. 2, the second clutch 32A is selectively engageable to connect the fourth interconnecting shaft or member 42 with the input shaft or member 12. Alternatively, in transmission 10B shown in FIG. 3, the second clutch 32B is selectively engageable to connect the third shaft or interconnecting member 40 with the fourth shaft or interconnecting member 42. The third clutch 34 is selectively engageable to connect the fifth shaft or interconnecting member 44 with the output shaft or member 22.

Figure 4:
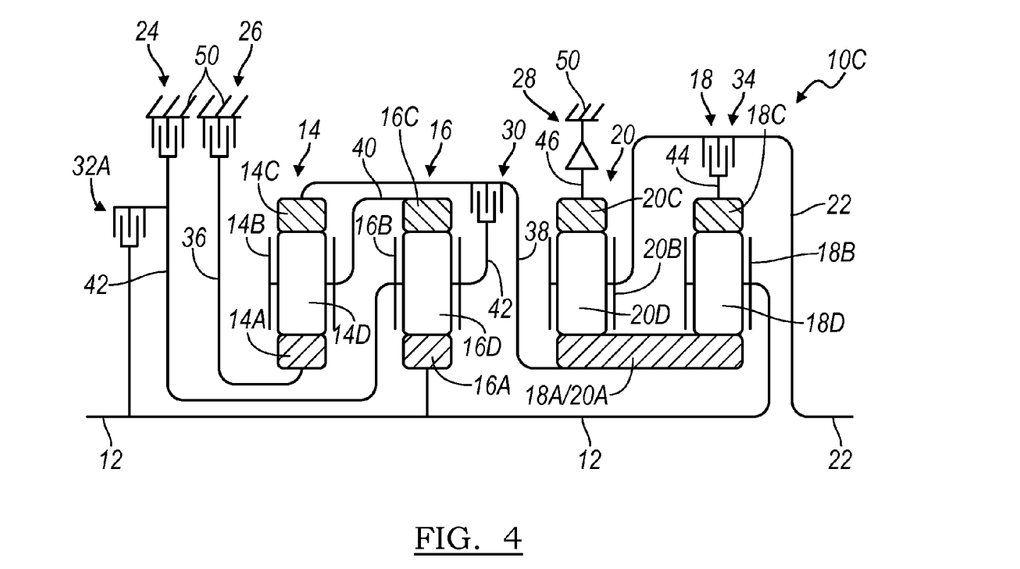
FIG. 4 is a schematic representation of another example of the transmission shown in FIG. 1 in accordance with the present invention.

Referring now to FIG. 4, a stick diagram presents a schematic layout of another example of the nine speed transmission 10C according to the present invention. In FIG. 4, the numbering from the lever diagram of FIG. 1 is carried over. The clutches, brake and couplings are correspondingly presented whereas the nodes of the planetary gear sets now appear as components of planetary gear sets such as sun gears, ring gears, planet gears and planet gear carriers.

In an example of the present invention, a first planetary gear set 14 is a simple planetary gear set. More specifically, planetary gear set 14 includes a sun gear member 14A, a ring gear member 14C and a carrier member 14B that rotatably supports a set of planet gears 14D (only one shown). Sun gear member 14A is connected for common rotation with a first shaft or interconnecting member 36. Ring gear member 14C is connected for common rotation with a second shaft or interconnecting member 38. Carrier member 14B is connected for common rotation with a third shaft or interconnecting member 40. The planet gears 14D are configured to intermesh with each of the sun gear member 14A and the ring gear member 14C.

In another example of the present invention, a second planetary gear set 16 is a simple planetary gear set. More specifically, planetary gear set 16 includes a sun gear member 16A, a ring gear member 16C and a carrier member 16B that rotatably supports a set of planet gears 16D (only one shown). Sun gear member 16A is connected for common rotation with an input shaft or member 12. Ring gear member 16C is connected for common rotation with the third shaft or interconnecting member 40. Carrier member 16B is connected for common rotation with a fourth shaft or interconnecting member 42. The planet gears 16D are configured to intermesh with each of the sun gear member 16A and the ring gear member 16C.

In yet another example of the present invention, a third planetary gear set 18 is a simple planetary gear set. More specifically, planetary gear set 18 includes a sun gear member 18/20A, a ring gear member 18C and a carrier member 18B that rotatably supports a set of planet gears 18D (only one shown). Sun gear member 18/20A functions as a combination of the first nodes 18A, 20A of the third and fourth planetary gear sets 18, 20 shown in FIG. 1. Sun gear member 18/20A is connected for common rotation with the second shaft or interconnecting member 38. Ring gear member 18C is connected for common rotation with a fifth shaft or interconnecting member 44. Carrier member 18B is connected for common rotation with the input shaft or member 12. The planet gears 18D are configured to intermesh with each of the sun gear member 18/20A and the ring gear member 18C.

In yet another example of the present invention, a fourth planetary gear set 20 is a simple planetary gear set. More specifically, planetary gear set 20 includes the sun gear member 18/20A, a ring gear member 20C and a carrier member 20B that rotatably supports a set of planet gears 20D (only one shown). Sun gear member 18/20A is shared with the third planetary gear set 18 and is connected for common rotation with the second shaft or interconnecting member 38. Ring gear member 20C is connected for common rotation with a sixth shaft or interconnecting member 46. Carrier member 20B is connected for common rotation with an output shaft or member 22. The planet gears 20D are configured to intermesh with each of the sun gear member 18/20A and the ring gear member 20C.

The input shaft or member 12 is preferably continuously connected to an engine (not shown) or to a turbine of a torque converter (not shown). The output shaft or member 22 is preferably continuously connected with a final drive unit or transfer case (not shown).

The torque-transmitting mechanisms 24, 26, 28, 30, 32A and 34 allow for selective interconnection of the shafts or interconnecting members 36-46, members of the planetary gear sets 14-20 and the stationary element or transmission housing 50. The torque-transmitting mechanisms include a first and second brake 24, 26, a selectable one-way clutch, dog clutch or band 28, and a first, second and third clutch 30, 32A, 34. For example, the first brake 24 is selectively engageable to connect the fourth shaft or interconnecting member 42 with the stationary element or transmission housing 50. The second brake 26 is selectively engageable to connect the first shaft or interconnecting member 36 with the stationary element or transmission housing 50. The selectable one-way clutch 28 is selectively engageable to connect the sixth shaft or interconnecting member 46 with the stationary element or transmission housing 50. The first clutch 30 is selectively engageable to connect the second shaft or interconnecting member 38 with the fourth shaft or interconnecting member 42. The second clutch 32A is selectively engageable to connect the fourth interconnecting shaft or member 42 with the input shaft or member 12. The third clutch 34 is selectively engageable to connect the fifth shaft or interconnecting member 44 with the output shaft or member 22.

Figure 5:
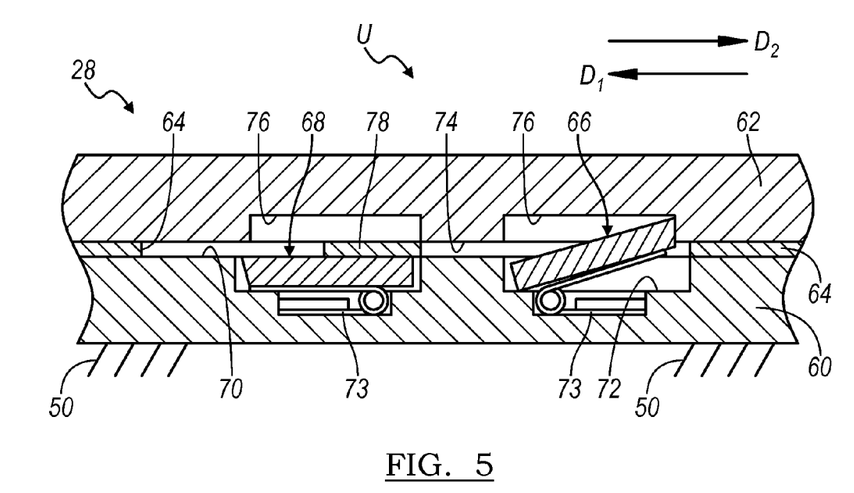
FIG. 5 is a cross section of a selectable one-way clutch in an activated or unlocked position in accordance with the present invention.
Figure 6:
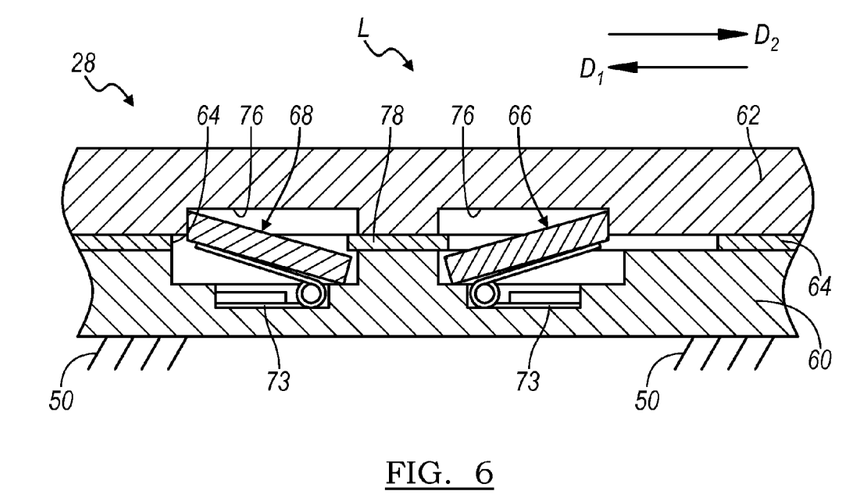
FIG. 6 is a cross section of a selectable one-way clutch in a deactivated or locked position in accordance with the present invention.

Referring now to FIGS. 5 and 6, two cross-section views of the selectable one-way clutch 28 are shown in each of a deactivated or unlocked U position (FIG. 5) and an activated or locked L position (FIG. 6). In the embodiment as shown, the selectable one-way clutch 28 is a strut-type selectable one-way clutch having a plurality of forward and reverse struts that are locking mechanisms used to provide a mechanical connection between rotating members. However, those skilled in the art will appreciate that other types of selectable one-way clutches employing other types of locking mechanisms may be used as well. Several examples of selectable one-way clutches that may be used are described in SAE Paper No. SAE-2009-01-0509, which is herein incorporated by reference in its entirety. The selectable one-way clutch includes an input disc or member 60, an output disc or member 62, a selection disc or member 64, a selection disc actuator (not shown), a forward locking mechanism 66 and a reverse locking mechanism 68. As previously stated when describing FIGS. 2, 3 and 4, the selectable one-way clutch is selectively engageable to connect the sixth shaft or interconnecting member 46 with the stationary element or transmission housing 50. The input disc or member 60 is fixed to a stationary member or transmission housing 50. The output disc or member 62 is rotationally connected to the sixth shaft or interconnecting member (not shown). The selection disc 64 is disposed between the input and output discs 60, 62 and remains stationary relative to the input disc 60 except when activated by the selection disc actuator (not shown).

The input disc or member 60 has a surface 70 that includes a plurality of recesses 72. One of the forward and reverse locking mechanisms 66, 68 is mounted in each recess. The output disc or member 62 has a surface 74 facing the first surface 70 of the input disc or member 60 and includes recesses 76 for receiving and engaging the locking mechanisms 66, 68. When each of the locking mechanisms 66, 68 are in the locked position L, as shown in FIG. 6, the locking mechanisms 66, 68 of the input disc or member 60 engage with recesses 76 of the output disc or member 62 thus preventing relative rotation between the input disc or member 60 and the output disc or member 62. The selection disc 64 includes an actuation feature 78 that when deactivated, as in FIG. 5, rotates over the reverse locking mechanism 68 thus preventing the reverse locking mechanism 68 from engaging with one of the recesses 76 of the output disc or member 62. A biasing member such as a spring 73 is in contact with both the locking mechanisms 66, 68. As seen in both FIGS. 5 and 6, the spring 73 is used to urge the reverse locking mechanism 68 out of the corresponding recess 72 and into the locked position L. Upon deactivation of the selection disc 64 into the unlocked position U, the selectable one-way clutch 28 operates in the same manner as a traditional one-way clutch. In the example transmission, when the selectable one-way clutch 28 is in the locked position L the selectable one-way clutch 28 interconnects the third member 20C of the fourth planetary gear set 20 with the stationary member or transmission housing 50. When the selectable one-way clutch 28 is in the unlocked position U the selectable one-way clutch 28 prevents rotation of the third member 20C of the fourth planetary gear set 20 in a first rotary direction D1 and allows rotation of the third member 20C of the fourth planetary gear set 20 in a second rotary direction D2.

It should be noted that the selectable one-way clutch 28 can include up to four modes of operation. For example, the selectable one-way clutch 28 may also include an open position O. In the open position, both the locking mechanisms 66 and 68 are depressed into their respective recesses 72 located in the input disc or member 60. The selectable one-way clutch 28 may also include another unlocked position as well. In this position, the actuation feature 78 rotates over the forward locking mechanism 66, thus preventing the forward locking mechanism 66 from engaging with one of the recesses 76 of the output disc or member 62, while the reverse locking mechanism 68 engages with the corresponding recess 76 in the output disc or member 62.

Figure 7:
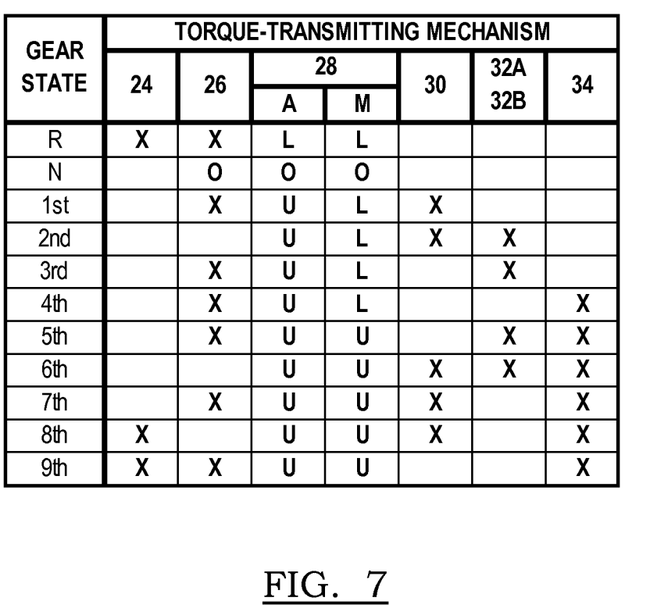
FIG. 7 is a truth table listing the engaged torque-transmitting mechanisms for selected torque ratios achieved by the transmissions of FIGS. 2, 3 and 4.

In yet another example of the invention, the transmission 10A-C has two operating modes; automatic mode A and manual mode M. In automatic mode A, the transmission 10A-C is operated such that the selectable one-way clutch 28 is activated or in locked position L when in reverse gear state R and activated or in unlocked position U when in first through ninth gear state $1^{st}$-$9^{th}$. When the transmission 10A-C is engaged in fifth through ninth gear state $5^{th}$-$9^{th}$, the selectable one-way clutch operates in glide or overrun mode. In glide mode, the output disc or member 62 spins in the second rotational direction D2 show in FIG. 5. Glide mode allows for drag losses that are significantly less than experienced with a traditional clutch mechanism. It should be noted that while FIG. 7 shows the locked position L and the unlocked position U illustrated in FIGS. 5 and 6, it is understood that the selectable one-way clutch 28 may use different mode selections as well. For example, in another embodiment, the selectable one-way clutch 28 could include an unlocked position where the forward locking mechanism 66 does not engage with one of the recesses 76 of the output disc or member 62, while the reverse locking mechanism 68 engages with the corresponding recess 76 in the output disc or member 62 (FIGS. 5 and 6).

While operating the transmission 10A-C in manual mode M the selectable one-way clutch is activated or in locked position L in reverse gear state R and in first through fourth gear state $1^{st}$-$4^{th}$. The manual mode M allows the ability of the operator to utilize engine braking as the selectable one-way clutch 28 effectively acts as a solid interconnecting member and does not allow the output disc or member 62 to rotate relative to the input disc or member 60. The selectable one-way clutch 28 is deactivated or in unlocked position U in fifth through ninth gear state $5^{th}$-$9^{th}$ to allow for glide mode as stated above in automatic mode A.

Referring now to FIGS. 2, 3, 4 and 7, the operation of the examples of the nine speed transmission 10A-C will be described. It will be appreciated that transmission 10A-C is capable of transmitting torque from the input shaft or member 12 to the output shaft or member 22 in at least nine forward speed states or torque ratios and at least one reverse speed state or torque ratio. Each forward and reverse speed state or torque ratio is attained by engagement of one or more of the torque transmitting mechanisms (i.e. first and second brake 24, 26 selectable one-way clutch 28, and first, second and third clutches 30, 32A, 32B, 34), as will be explained below. FIG. 7 is a truth table presenting the various combinations of torque transmitting mechanisms that are activated or engaged X to achieve the various gear states.

For example, to establish reverse gear state R in automatic mode A or manual mode M, the selectable one-way clutch 28 is locked L and the first and second brakes 24, 26 are engaged or activated X. The selectable one-way clutch 28 in locked mode L connects the sixth shaft or interconnecting member 46 with the stationary element or transmission housing 50. The first brake 24 connects the fourth shaft or interconnecting member 42 with the stationary element or transmission housing 50. The second brake 26 connects the first shaft or interconnecting member 36 with the stationary element or transmission housing 50.

To establish the first gear state $1^{st}$ in automatic mode A the selectable one-way clutch 28 is unlocked U and the second brake 26 and the first clutch 30 is engaged or activated X. The selectable one-way clutch 28 in unlocked mode U acts as a traditional one-way clutch between the sixth shaft or interconnecting member 46 and the stationary element or transmission housing 50. The second brake 26 connects the first shaft or interconnecting member 36 with the stationary element or transmission housing 50. The first clutch 30 connects the second shaft or interconnecting member 38 with the fourth shaft or interconnecting member 42.

To establish the first gear state $1^{st}$ in manual mode M the selectable one-way clutch 28 is locked L and the second brake 26 and the first clutch 30 is engaged or activated X. The selectable one-way clutch 28 in locked mode L acts as a traditional activated clutch connecting the sixth shaft or interconnecting member 46 and the stationary element or transmission housing 50. The second brake 26 connects the first shaft or interconnecting member 36 with the stationary element or transmission housing 50. The first clutch 30 connects the second shaft or interconnecting member 38 with the fourth shaft or interconnecting member 42.

To establish sixth gear state 6th in automatic mode A or manual mode M for the transmission 10A, 10C shown in FIGS. 2 and 4, the selectable one-way clutch 28 is unlocked U and the clutches 30, 32A, 34 are engaged or activated X. The selectable one-way clutch 28 in unlocked mode U acts as a traditional one-way clutch between the sixth shaft or interconnecting member 46 and the stationary element or transmission housing 50. The first clutch 30 connects the second shaft or interconnecting member 38 with the fourth shaft or interconnecting member 42. The second clutch 32A connects the fourth shaft or interconnecting member 42 with the input shaft or member 12. The third clutch 34 connects the fifth shaft or interconnecting member 44 with the output shaft or member 22. Likewise, the nine forward speed states are achieved through different combinations of selectable one-way clutch, clutch and brake mode and engagement, as shown in FIG. 7.

To establish sixth gear state 6th in automatic mode A or manual mode M for the transmission 10B shown in FIG. 3, the selectable one-way clutch 28 is unlocked U and the clutches 30, 32B, 34 are engaged or activated X. The selectable one-way clutch 28 in unlocked mode U acts as a traditional one-way clutch between the sixth shaft or interconnecting member 46 and the stationary element or transmission housing 50. The first clutch 30 connects the second shaft or interconnecting member 38 with the fourth shaft or interconnecting member 42. The second clutch 32B connects the third shaft or interconnecting member 40 with the fourth shaft or interconnecting member 42. The third clutch 34 connects the fifth shaft or interconnecting member 44 with the output shaft or member 22. Likewise, the nine forward speed states are achieved through different combinations of selectable one-way clutch, clutch and brake mode and engagement, as shown in FIG. 7.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
    an input member;
    an output member;
    a first, second, third and fourth planetary gear sets each having first, second and third members;
    a first interconnecting member continuously interconnecting the third member of the first planetary gear set with the first members of the third and fourth planetary gear sets;
    a second interconnecting member continuously interconnecting the second member of the first planetary gear set with the third member of the second planetary gear set;
    a third interconnecting member continuously interconnecting the first member of the second planetary gear set and the input member with the second member of the fourth planetary gear set;
    a first torque transmitting device selectively engageable to interconnect the input member, the first member of the second planetary gear set and second member of the fourth planetary gear set with the second member of the second planetary gear set;
    a second torque transmitting device selectively engageable to interconnect the second member of the second planetary gear set with the third member of the first planetary gear set and the first members of the third and fourth planetary gear sets;
    a third torque transmitting device selectively engageable to interconnect the second member of the third planetary gear set and the output member with the third member of the fourth planetary gear set;
    a fourth torque transmitting device selectively engageable to interconnect the second member of the second planetary gear set with the stationary member;
    a fifth torque transmitting device selectively engageable to interconnect the first member of the first planetary gear set with the stationary member; and
    a one-way clutch selectively engageable to interconnect the third member of the third planetary gear set with the stationary member, and
    wherein the torque transmitting devices are selectively engageable in combinations of at least three and the one-way clutch is engageable between a locked position and an unlocked position to establish at least nine forward speed ratios and at least one reverse speed ratio between the input member and the output member.

2. The transmission of claim 1 wherein the one-way clutch is locked in the reverse gear ratio and unlocked in a first, second, third, fourth, fifth, sixth, seventh, eighth, and ninth gear ratios when the transmission is in a first mode of operation.

3. The transmission of claim 2 wherein the one-way clutch is locked in the reverse gear ratio, the first, second, third, and fourth gear ratios and unlocked in the fifth, sixth, seventh, eighth, and ninth gear ratios when the transmission is in a second mode of operation.

4. The transmission of claim 3 wherein the first mode of operation is a Drive mode of operation and the second mode of operation is a Manual mode of operation used to provide engine braking.

5. The transmission of claim 1 wherein the first members are sun gears, the second members are carrier members and the third members are ring gears.

6. The transmission of claim 1 wherein the input member is continuously interconnected with the first member of the second planetary gear set and the second member of the fourth planetary gear set.

7. The transmission of claim 1 wherein the output member is continuously interconnected with the second member of the third planetary gear set.

8. The transmission of claim 1 wherein the first member of the third gear set and the first member of the fourth gear set are a single unitary member.

9. A transmission comprising:
    an input member;
    an output member;
    a first, second, third and fourth planetary gear sets each having first, second and third members;
    a first interconnecting member continuously interconnecting the third member of the first planetary gear set with the first members of the third and fourth planetary gear sets;
    a second interconnecting member continuously interconnecting the second member of the first planetary gear set with the third member of the second planetary gear set;
    a third interconnecting member continuously interconnecting the first member of the second planetary gear set and the input member with the second member of the fourth planetary gear set;
    a first torque transmitting device selectively engageable to interconnect the second member of the second planetary gear set with the second member of the first planetary gear set and the third member of the second planetary gear set;

a second torque transmitting device selectively engageable to interconnect the second member of the second planetary gear set with the third member of the first planetary gear set and the first members of the third and fourth planetary gear sets;

a third torque transmitting device selectively engageable to interconnect the second member of the third planetary gear set and the output member with the third member of the fourth planetary gear set;

a fourth torque transmitting device selectively engageable to interconnect the second member of the second planetary gear set with the stationary member;

a fifth torque transmitting device selectively engageable to interconnect the first member of the first planetary gear set with the stationary member; and a one-way clutch selectively engageable to interconnect the third member of the third planetary gear set with the stationary member, and wherein the torque transmitting devices are selectively engageable in combinations of at least three and the one-way clutch is engageable between a locked position and an unlocked position to establish at least nine forward speed ratios and at least one reverse speed ratio between the input member and the output member.

10. The transmission of claim 9 wherein the one-way clutch is locked in the reverse gear ratio and unlocked in a first, second, third, fourth, fifth, sixth, seventh, eighth, and ninth gear ratios when the transmission is in a first mode of operation.

11. The transmission of claim 10 wherein the one-way clutch is locked in the reverse gear ratio, the first, second, third, and fourth gear ratios and unlocked in the fifth, sixth, seventh, eighth, and ninth gear ratios when the transmission is in a second mode of operation.

12. The transmission of claim 11 wherein the first mode of operation is a Drive mode of operation and the second mode of operation is a Manual mode of operation used to provide engine braking.

13. The transmission of claim 9 wherein the first members are sun gears, the second members are carrier members and the third members are ring gears.

14. The transmission of claim 9 wherein the input member is continuously interconnected with the first member of the second planetary gear set and the second member of the fourth planetary gear set.

15. The transmission of claim 9 wherein the output member is continuously interconnected with the second member of the third planetary gear set.

16. The transmission of claim 9 wherein the first member of the third gear set and the first member of the fourth gear set are a single unitary member.

17. A transmission operable in a Drive mode of operation and in a engine braking mode of operation, the transmission comprising:
an input member;
an output member;
a first, second, third and fourth planetary gear sets each having first, second and third members;

a first interconnecting member continuously interconnecting the third member of the first planetary gear set with the first members of the third and fourth planetary gear sets;

a second interconnecting member continuously interconnecting the second member of the first planetary gear set with the third member of the second planetary gear set;

a third interconnecting member continuously interconnecting the first member of the second planetary gear set and the input member with the second member of the fourth planetary gear set;

a first torque transmitting device selectively engageable to interconnect the input member, the first member of the second planetary gear set and second member of the fourth planetary gear set with the second member of the second planetary gear set;

a second torque transmitting device selectively engageable to interconnect the second member of the second planetary gear set with the third member of the first planetary gear set and the first members of the third and fourth planetary gear sets;

a third torque transmitting device selectively engageable to interconnect the second member of the third planetary gear set and the output member with the third member of the fourth planetary gear set;

a fourth torque transmitting device selectively engageable to interconnect the second member of the second planetary gear set with the stationary member;

a fifth torque transmitting device selectively engageable to interconnect the first member of the first planetary gear set with the stationary member; and a one-way clutch selectively engageable to interconnect the third member of the third planetary gear set with the stationary member, and wherein the torque transmitting devices are selectively engageable in combinations of at least three to establish at least nine forward speed ratios and at least one reverse speed ratio between the input member and the output member, and wherein the one-way clutch is locked in the reverse gear ratio and unlocked in a first, second, third, fourth, fifth, sixth, seventh, eighth, and ninth gear ratios when the transmission is in the Drive mode of operation and the one-way clutch is locked in the reverse gear ratio, the first, second, third, and fourth gear ratios and unlocked in the fifth, sixth, seventh, eighth, and ninth gear ratios when the transmission is in the engine brake mode of operation.

18. The transmission of claim 17 wherein the first members are sun gears, the second members are carrier members and the third members are ring gears.

19. The transmission of claim 17 wherein the input member is continuously interconnected with the first member of the second planetary gear set and the second member of the fourth planetary gear set.

20. The transmission of claim 17 wherein the output member is continuously interconnected with the second member of the third planetary gear set.

* * * * *